United States Patent
Bober

(10) Patent No.: US 11,800,951 B1
(45) Date of Patent: Oct. 31, 2023

(54) CAST IRON COMPOSITE COOKING VESSEL

(71) Applicant: David Boyd Bober, San Leandro, CA (US)

(72) Inventor: David Boyd Bober, San Leandro, CA (US)

( * ) Notice: Subject to any disclaimer, the term of this patent is extended or adjusted under 35 U.S.C. 154(b) by 0 days.

(21) Appl. No.: 17/717,080

(22) Filed: Apr. 10, 2022

(51) Int. Cl.
| | |
|---|---|
| *A47J 36/02* | (2006.01) |
| *B23K 20/22* | (2006.01) |
| *B22D 19/00* | (2006.01) |
| *B23K 20/227* | (2006.01) |

(52) U.S. Cl.
CPC .......... *A47J 36/02* (2013.01); *B22D 19/0045* (2013.01); *B23K 20/227* (2013.01)

(58) Field of Classification Search
CPC ......... B65D 1/40; A47J 27/002; A47J 36/025; A47J 36/02; B22D 19/0045; B22D 19/00; B23K 20/227; B23K 20/2275; B23K 20/22; C23C 4/06; C23C 4/067; C23C 4/08; Y10S 220/912; B23P 19/04; B21D 51/22
USPC ............ 220/573.3, 573.2, 573.1, 912, 62.17, 220/62.16; 427/456, 455, 367; 29/469, 29/428; 72/379.4
See application file for complete search history.

(56) References Cited

U.S. PATENT DOCUMENTS

| | | |
|---|---|---|
| 2,121,001 A | 6/1938 | Arness |
| 2,358,104 A | 9/1944 | Scavullo |
| 2,604,227 A | 7/1952 | Carriker |
| 3,105,292 A | 10/1963 | Jeune |
| 3,173,202 A * | 3/1965 | Farber ................. B23K 20/2333 228/208 |
| 2,744,995 A | 5/1965 | Jepson |
| 3,745,290 A * | 7/1973 | Harnden, Jr. ........... A47J 39/00 220/574 |
| 3,798,415 A | 3/1974 | Graham |
| 4,004,892 A | 1/1976 | Ulam |
| 3,966,426 A * | 6/1976 | McCoy .................... A47J 36/02 428/685 |
| 3,977,459 A | 8/1976 | Bonitz |
| 4,003,715 A | 1/1977 | Cascone |
| 4,246,045 A | 1/1981 | Ulam |
| 4,268,741 A | 5/1981 | O'Brien |
| 4,768,427 A * | 9/1988 | Cheng ..................... A47J 37/10 99/422 |
| 5,487,329 A | 1/1996 | Fissler |

(Continued)

FOREIGN PATENT DOCUMENTS

| | | | |
|---|---|---|---|
| EP | 510546 A1 * | 10/1992 | ............. A47J 36/02 |
| GB | 1046798 A * | 10/1966 | ............. B23K 10/02 |

(Continued)

OTHER PUBLICATIONS

Translation of WO2012016405, Lai, Feb. 9, 2012, Paragraph 16. (Year: 2012).*

(Continued)

*Primary Examiner* — Robert J Hicks

(57) ABSTRACT

A cooking utensil is described which provides a cast iron cooking surface, the reverse of which is metallurgically bonded to another member having higher thermal conductivity than cast iron. In some embodiments, the cast iron layer is bonded to a copper core, which is bonded to a stainless steel base. Two methods for producing such articles are also described.

17 Claims, 2 Drawing Sheets

(56) References Cited

U.S. PATENT DOCUMENTS

| | | | |
|---|---|---|---|
| 5,964,145 A | 10/1999 | Brown | |
| 7,926,418 B2 | 4/2011 | Groll | |
| 2004/0229079 A1* | 11/2004 | Groll | A47J 36/02 |
| | | | 428/653 |
| 2007/0218297 A1* | 9/2007 | Jeon | B82Y 40/00 |
| | | | 427/407.1 |
| 2010/0206884 A1* | 8/2010 | Tunstall | A47J 27/022 |
| | | | 220/573.1 |
| 2010/0276432 A1* | 11/2010 | Huo | A47J 36/02 |
| | | | 220/573.2 |
| 2022/0240715 A1* | 8/2022 | Ferron | A47J 36/02 |

FOREIGN PATENT DOCUMENTS

| | | | | |
|---|---|---|---|---|
| KR | 20110056740 A * | 5/2011 | | A47J 36/02 |
| WO | WO-2010043826 A2 * | 4/2010 | | A47J 36/02 |
| WO | WO-2012016405 A1 * | 2/2012 | | A47J 27/002 |

OTHER PUBLICATIONS

"An Introduction to Thermal Spray" published May 2022 by the Oerlikon Metco Corporation.

* cited by examiner

CAST IRON COMPOSITE COOKING VESSEL

BACKGROUND OF THE INVENTION

The following is a tabulation of some documents that presently appears relevant:

US Patents

| U.S. Pat. Nos. | | | |
| --- | --- | --- | --- |
| Pat. No. | Kind Code | Issue Date | Patentee |
| 2,358,104 | A | 1944 Sep. 12 | Scavullo |
| 2,604,227 | A | 1952 Jul. 22 | Carriker |
| 4,004,892 | A | 1976 Jan. 25 | Ulam |
| 4,246,045 | A | 1981 Jan. 20 | Ulam |
| 5,487,329 | A | 1996 Jan. 30 | Fissler |
| 4,268,741 | A | 1981 May 19 | O'Brien |
| 5,964,145 | A | 1999 Oct. 12 | Brown |
| 2,744,995 | A | 1965 May 8 | Jepson |
| 3,798,415 | A | 1974 Mar. 19 | Graham |
| 7,926,418 | B2 | 2011 Apr. 19 | Groll |
| 4,003,715 | A | 1977 Jan. 18 | Cascone |
| 3,105,292 | A | 1963 Oct. 1 | Le Jeune |
| 3,977,459 | A | 1976 Aug. 31 | Bonitz |

Oil-seasoned cast iron cookware provides a natural non-stick cooking surface. Able to withstand high searing temperatures, and manufactured from non-toxic materials, this traditional cookware remains popular today. One drawback of cast iron cookware is the material's low thermal conductivity, which requires slow and careful heating to reach a uniform temperature, and which is difficult to maintain at a uniform temperature under high heat flux cooking conditions.

Stainless steel cookware suffers from similar heat distribution issues because it also has a low thermal conductivity. With respect to stainless steel, this problem has largely been solved by adopting composite architectures in which a stainless steel cooking surface is bonded to one or more layers having higher thermal conductivity, such as copper or aluminum. Early efforts to create such composites employed electrodeposition of copper (U.S. Pat. No. 2,358,104 (1944)) or casting of aluminum onto stainless steel (U.S. Pat. No. 2,604,227 (1952)). Electrodeposition has largely been found unsatisfactory due to the long times needed to produce thick coatings and their frequently poor adhesion. For an aluminum layer cast around a stainless steel insert, the quality of the bond is typically more mechanical than metallurgical. This leads to issues like debonding and poor heat transfer, in addition to added design constraints. Composite stainless steel cookware on the market today is typically made by a variety of diffusion bonding techniques in which a plurality of metal layers is subjected to plastic deformation and high heat, e.g., roll bonding (U.S. Pat. No. 4,004,892 (1976)]. This combination of processes disrupts surface oxide and promotes diffusion, resulting in a robust metallurgical bond. The process is also well suited to multilayer structures, so additional layers not needed for their thermal conductivity are sometimes added to enhance other properties, for example induction heating capability or external durability (U.S. Pat. No. 4,246,045 (1981)). Though less common, some composite stainless steel cookware designs also employ liquid phase bonding processes [U.S. Pat. No. 5,487,329 (1996)], e.g., brazing.

Grey cast iron alloys used in cookware are not amenable to roll bonding or similar processes because they lack the necessary ductility. Without the ability to disrupt surface oxides through deformation, diffusion bonding is much slower, if not impossible. In the past, higher thermal conductivity layers have instead been added to cast iron by mechanical methods, e.g., clamps and fasteners (U.S. Pat. No. 4,268,741 (1981)). This results in poorer heat transfer than a metallurgical bond, motivating the use of intermediate substances, like thermal grease (U.S. Pat. No. 5,964,145 (1999)). Mechanical bonds also tend to allow water into the joint, which can be corrosive, unsanitary, and lead to buckling (U.S. Pat. No. 2,744,995 (1956)). These problems motivate the use of polymer sealants, which in turn have lower temperature limits and durability than would metallurgical bonds (U.S. Pat. No. 3,798,415 (1974)).

Vacuum adhesion is another cookware bonding technique that does not require a ductile metal (U.S. Pat. No. 7,926,418 (2011)). Vacuum adhesion provides firm mechanical contact between metal layers by sealing them together under vacuum, ambient pressure thereafter providing a sustained clamping force. The combination of perimeter seal and vacuum avoids many of the problems encountered by other clamping methods. However, the perimeter seal requires either a mechanically clamped gasket or metallurgical bond. The former is undesirable with respect to size, weight and aesthetics. The latter is challenging for cast iron due to the difficulty of forming hermetic welds or brazes.

The difficulties in welding or brazing cast iron are well known and so are only briefly summarized here. For welding, these consist of a tendency to form brittle microstructures if cooled too rapidly, and cracks produced by an inability to deform plastically in response to thermal or solidification induced stress. For brazing, the chief difficulty is cast iron's low wettability by liquid metals and the resulting difficulty of using capillary action to cause molten filler to flow within a joint. This can be mitigated by cleaning steps that remove graphite from the surface, but these methods are varying combinations of expensive or partially effective. Alternatively, brazing alloys of special composition may be employed which enhance the wettability of graphite bearing surfaces, though these have combinations of wetting and flowability that limit the breadth of the achievable joints, e.g., Cu—Mn—Zn—Ni (U.S. Pat. No. 4,003,715 (1977)), and may require highly inert atmospheres. They also tend to be expensive due to a high silver content, e.g., Ag—Cu—Zn—Mn—Ni. Another alternative is to coat the cast iron surface with a different metal or intermetallic prior to brazing, for example by dipping in molten aluminum to form an Fe—Al intermetallic layer (U.S. Pat. No. 3,105,292 (1952)). Unfortunately, such layers are brittle and prone to fail under repeated thermal cycling unless the alloy compositions are adjusted to limit differential thermal expansion (U.S. Pat. No. 3,977,459 (1976)). Casting an aluminum shell around a cast iron insert suffers from the same issue but to a greater extent because the thickness of the brittle layer is more difficult to control during casting as compared to dipping. These properties combine to create much difficulty in the production of thin, strong, large area, metallurgical joints involving cast iron members.

SUMMARY OF THE INVENTION

A first member is metallurgically bonded to a second member, the latter comprising cast iron and providing a cooking surface. The first member may comprise more than one layer, at least one of which is a high thermal conductivity metal such as copper or aluminum. The additional layers of the first member may include, for example, a stainless steel backer. The first and second members are connected by a joint which is thin, has a large bond area, and is metallurgical in character.

Two methods for making the bond between the first and second members are disclosed. The first method places a molten filler metal in contact with the solid faces to be joined, which are then brought closer together. This action causes the filler to flow throughout the joint, even if the molten filler does not strongly wet the faces to be joined, or would flow only sluggishly under capillary action alone. In the second method, the first member is coated with a metal which has a lower melting point. The second member is then cast around the first member in a liquid state. The low melting point coating is melted by contact with the liquid iron, facilitating a metallurgical bond.

BRIEF DESCRIPTION OF DRAWINGS

The above and other objects, features, and advantages will become more readily apparent from the following description, reference being made to the accompanying drawing in which,
(a)

DETAILED DESCRIPTION OF THE INVENTION

Figure 1:
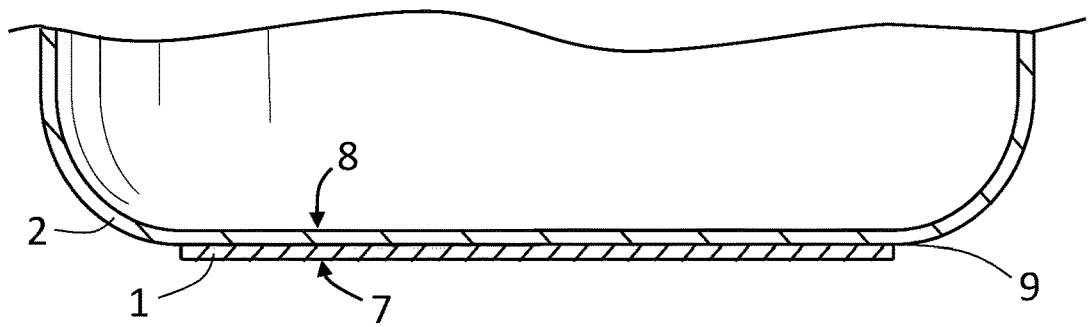
FIG. 1 is a vertical cross section through a cooking utensil according to one embodiment;
(b)

EXAMPLE EMBODIMENT A: In one embodiment, shown in FIG. 1, a cast iron copper composite skillet is manufactured by,
(a) providing a first member (1) comprising a wrought disc of C101 copper, and having an approximate thickness of 0.8 to 1.6 mm (1/32 to 1/8 inch), and a diameter substantially like that of the skillet to be produced,
(b) providing a second member (2) comprising cast iron, and having a shape substantially like the final skillet to be produced,
(c) positioning the second member and first member in a spaced relation,
(d) introducing a filler metal between the first member and second member,
(e) heating the filler metal, the second member, and the first member above the melting temperature of the filler metal, and,
(f) urging the first and second members together by pressure on the outer faces (7, 8), whereby the molten filler metal is caused to flow throughout the joint (9).

Figure 2:
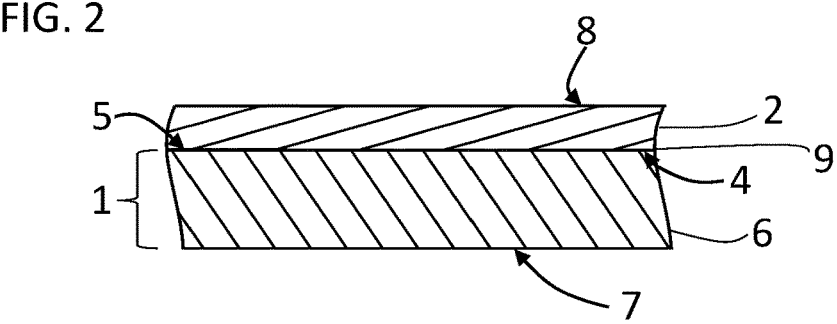
FIG. 2 is a cross section showing the composite structure of one embodiment;
(c)

The result is a pan with the layered base shown in FIG. 2.

Prior to the bonding process described above, the base (4) of the second member (2) is abrasively cleaned by grinding. This surface (4) forms the portion of the cast iron (2) which will be bonded to the first member (1). Embedded foundry sand and scale is to be removed during the grinding step. The upper face (5) of the first member (1) is degreased and abrasively cleaned. The clean upper face of the copper (6) and base of the cast iron (4) form the surfaces to be bonded. Notice that reference character 1 in FIG. 2 refers to the first member, which in general can comprise multiple layers, while reference character 6 specifies one layer within the first member, in this case copper. In the present embodiment, there is only one layer (6) in the first member (1), so the distinction may seem superfluous. However, the first member (1) of other embodiments comprises multiple layers, e.g., embodiment H, and it is helpful to refer to these layers both individually and collectively, as provided by the scheme described. Therefore, this nomenclature is adopted here for consistency.

The surfaces (4, 5) to be bonded are each coated in an aqueous slurry of borax-based flux. The flux may be distributed in any of the usual forms, such as powder, paste, slurry, dip coating, or spray coating.

The cast iron member (2) is placed such that the ground surface of its base (4) is facing upward. Low fuming bronze brazing Cu—Zn alloy (AWS RBCuZnC) is distributed on the fluxed portion of the cast iron (4). The brazing filler metal may be introduced between the cast iron (2) and copper (6) as a sheet, or spread as pieces, granules, powder, or paste. The cleaned and fluxed copper member (6) is placed on top of the brazing filler, with the fluxed side (5) facing the filler.

This assembly is heated to a substantially uniform temperature of approximately 720-840° C. (1330-1550° F.), whereby the flux and filler are melted. The heating may be accomplished in any manner that is convenient and does not cause excessive oxidation within the area to be joined. Reducing atmospheres in gas or electric furnaces have been found suitable.

The copper (6) and cast iron members (2) are then urged together by the action of a force applied to the outside face of the first member (7) and outside face of the second member (8). The average pressure across the area to be bonded is approximately 70 to 340 kPa (10-50 psi). The goal of the applied pressure is to close the joint (9), forcing a flow of brazing alloy throughout the joint (9) and expelling a fraction at the perimeter. This overcomes the prior limitations noted in regard to wettability and flow of brazing alloys in cast iron joints. The second member (2) and first member (1) may be shaped so that the compression step produces a single line of progressively expanding contact. For example, the first member (1) can have a gentle hemispherical curvature, the convex face being the side (5) to be joined. The mating cast iron surface (4) is substantially flat. Upon the application of pressure, the convex member flattens from the center outwards, sweeping a wave of molten material ahead of the expanding contact line. The result is a peristaltic flow of the molten material. During the application of pressure, the cast iron layer (2) should be prevented from deforming to the greatest extent possible to avoid warping or cracking. This can be accomplished by backing the outer cast iron side (8) with a rigid tool. The first member (1) can be backed directly by a second rigid tool. Insulating cushions may also be placed between one or both metal members and their supporting tools, though if the cast iron (2) is backed by a cushion then applying a uniform pressure helps to limit warping. Refractory fiber blankets have been found to be a suitable cushion. Introducing an additional lateral motion between the second member (2) and the first member (1) as they are pressed together has also been found to be useful. For an enhanced aesthetic effect, and reduced post-processing, the edges of the joint (9) may be wiped free of molten flux and brazing alloy before cooling, for example with a wire brush.

The assembly is allowed to cool under pressure until the temperature is below approximately 540° C. (1000° F.), at which point the filler solidifies sufficiently to hold the joint (9) closed. The cooling process may be reduced if solidification is assisted by diffusion of elements which raises the solidification temperature of the filler. The assembly may be cooled further while under pressure to control warpage, or the pressure may be removed and cooling allowed to proceed under ambient loads.

The final finishing steps are standard, including the removal of excess cast iron thickness from the interior (8) of the skillet, applying a smooth finish to the cooking surface (8), and finally applying a light abrasive blasting to improve subsequent application of oil-based seasoning.

The resulting embodiment is a cooking utensil having the shape of a skillet, comprising:
  (a) a first member (1) comprising a copper sheet (6), whereby high thermal conductivity is provided,
  (b) a second member (2) comprising cast iron, whereby an oil seasoned iron cooking surface (8) is provided,
  (c) the second member (2) and the first member (1) connected by a metallurgical bond (9), whereby thermal conductivity and mechanical adhesion is provided.

In use, the composite skillet is heated on any kitchen range, heat being applied to the outer face of the first member (7). Food is cooked on the cast iron surface (8) after an appropriate oil seasoning.

EXAMPLE EMBODIMENT B: In another embodiment, a composite cookware structure like that in FIG. 2 is manufactured by,
  (a) providing a first member (1) comprising a layer of copper (6),
  (b) coating at least one face (5) of the first member (1) with a Sn—Ag alloy having a lower melting point than both copper and cast iron,
  (c) introducing molten iron (2) to the first member (1), whereby the coating of the first member is melted and a metallurgical bond is formed.

To coat the first member (1) with the Sn—Ag alloy, it is first degreased and abrasively cleaned. A zinc chloride flux is then applied, followed by heating to 215-240° C. (420-460° F.). The Sn—Ag layer is then applied by melting this alloy against the surface and allowing it to flow into a thin layer, or alternatively by dipping the first member into a liquid bath of Sn—Ag. The coated first member is then cooled and cleaned of any remaining flux residue. The removal of remaining flux and flux residue helps to minimize gas generation during subsequent hot processing.

The coated member is then placed within a mold suitable for casting a surrounding iron form, for example foundry sand. The mold should be provided with anchor points to restrain the first member (1), maintaining its position and shape. The mold may then be preheated to below the melting point of the materials of the first member (1). Molten cast iron is introduced in the usual fashion. The molten iron (2) causes the Sn—Ag layer to melt and partially dissolve into the iron. This reveals a chemically clean, unoxidized interface (5) on the first member (1). This causes a metallurgical bond to form between the iron (2), the first member (1), and the remaining Sn—Ag.

EXAMPLE EMBODIMENT C: Another embodiment, whose composite structure is also like that in FIG. 2, is prepared similarly to embodiment A, except;
  1. the brazing alloy has a composition of Ag—Cu—Zn—Mn—Ni (49-16-23-4.5-7.5%), i.e., AWS A5.8 BAg-22,
  2. the flux is an active fluoride/borate compound,
  3. the peak brazing temperature is reduced to 650-700° C. (1200-1300° F.), and
  4. the temperature at which the pressure is released is reduced to approximately 480° C. (900° F.).

Figure 3:
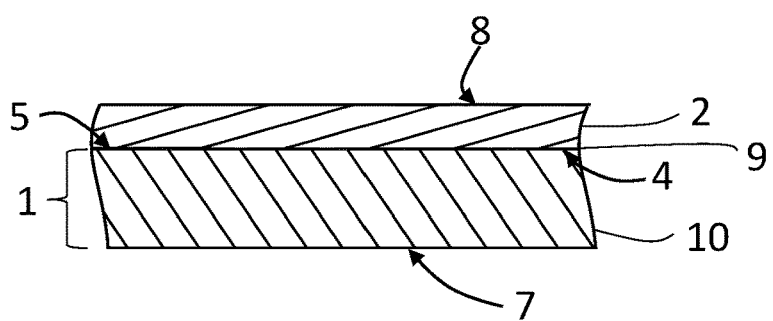
FIG. 3 is a cross section showing the composite structure of an additional embodiment;
(d)

EXAMPLE EMBODIMENT D: Another embodiment, whose composite structure is shown in FIG. 3, is prepared similarly to embodiment A, except;
  1. The first member (1) consists of 1100 series Aluminum (10)
  2. the brazing filler is a Zn—Al alloy
  3. the flux is a cesium-fluoroaluminate complex
  4. the peak brazing temperature is reduced to approximately 430-480° C. (800-900° F.)
  5. The temperature at which the pressure is released is reduced to approximately 320° C. (600° F.).

All reference numbers in FIG. 3 not specifically mentioned above refer to the same structures previously defined in the discussion of FIG. 2.

EXAMPLE EMBODIMENT E: Another embodiment is prepared similarly to embodiment D, except;
  1. the brazing filler is a Zn—Si alloy
  2. the flux comprises potassium fluoroaluminate salts
  3. the peak brazing temperature is reduced to approximately 510-540° C. (950-1000° F.)
  4. The temperature at which the pressure is released is reduced to approximately 370° C. (700° F.).

Figure 4:
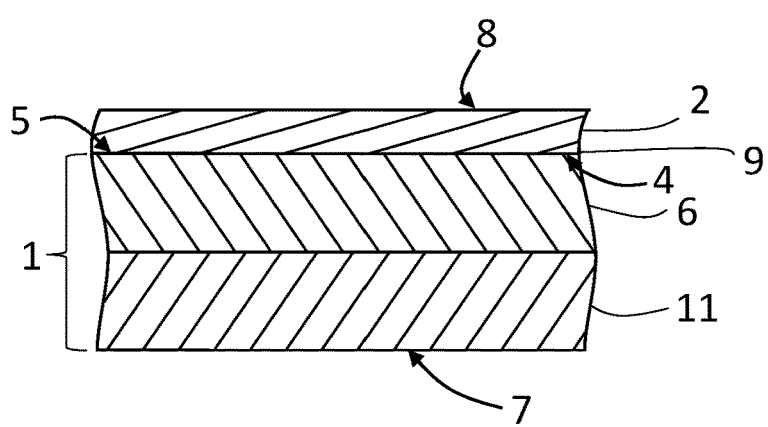
FIG. 4 is a cross section showing the composite structure of an additional embodiment;
(e)

EXAMPLE EMBODIMENT F: Another example embodiment, whose composite structure is shown in FIG. 4, is like embodiments A and B, except the first member (1) comprises a layer of stainless steel (11) roll bonded to a layer of copper (6) before the copper face (5) is bonded to the cast iron face (4) as in embodiment A or B. This provides a ferromagnetic layer of material on the face which contacts the kitchen range, improving performance on induction cooktops. All reference numbers in FIG. 4 not specifically mentioned above refer to the same structures previously defined in the discussion of FIG. 2.

Figure 5:
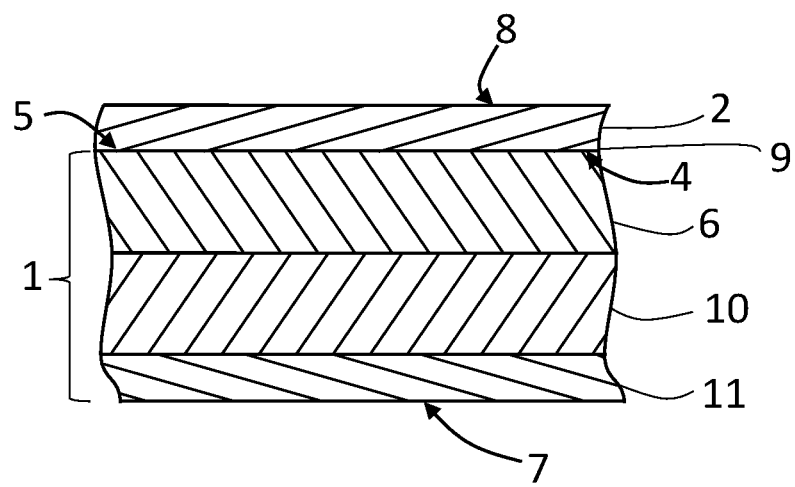
FIG. 5 is a cross section showing the composite structure of an additional embodiment;
(f)

EXAMPLE EMBODIMENT G: Another example embodiment, whose composite structure is shown in FIG. 5, is like embodiments A and B, but the first member (1) comprises layers of copper (6), aluminum (10) and stainless steel (11), roll bonded in that order. The exposed copper face (5) is again metallurgically bonded to the cast iron face (4), as in embodiment A or B. This provides a means to reduce the weight while maintaining high thermal conductivity. All reference numbers in FIG. 5 not specifically mentioned above refer to the same structures previously defined in the discussion of FIG. 2.

Figure 6:
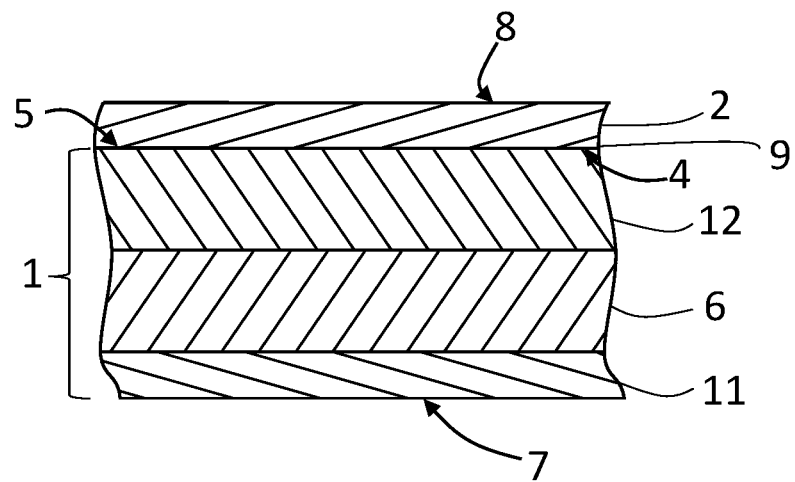
FIG. 6 is a cross section showing the composite structure of an additional embodiment.

EXAMPLE EMBODIMENT H: Another example embodiment, whose composite structure is shown in FIG. 6, is like embodiments A and B, but the first member (1) comprises layers of stainless steel (11), copper (6), and stainless steel (12), roll bonded in that order. One exposed stainless steel face (5) is again metallurgically bonded to the second member (2), a in embodiment A or B. All reference numbers in FIG. 6 not specifically mentioned above refer to the same structures previously defined in the discussion of FIG. 2.

Thus, the reader will see that at least one embodiment of the cooking utensil provides a cast iron cooking surface (8) as part of a composite having thermal conductivity greater than that of cast iron. While the above description contains many specifications, these should not be construed as limitations on the scope, but rather as an exemplification of several embodiments thereof. For example, conventional features like a handle, lip, or pour spouts have not been described but may be included. Many variations are possible. For example, in other embodiments the cast iron component has the form of a fry pan, dutch oven, wok, griddle, waffle iron, or crepe pan. A further example embodiment includes a first member comprising layers of Al and stainless steel. A yet further example embodiment includes a first member comprising layers of Al, Cu, and stainless steel, bonded in that order. In still further embodiments the brazing filler material is an alloy of Cu—Zn, Ag—Cu—Zn—Mn—Ni, Ag—Cu—Ti, Cu—Zn—Ni, or other conventional or reactive fillers. In still further embodiments, the intermediate bonding layer used in the casting method may be Ag or Cu—Si. In a yet further embodiment, the first member which is to be cast over with molten iron may be temporarily connected to a heat transfer plate during casting, providing for controlled cooling.

The invention claimed is:

1. A cooking utensil, comprising:
   (a) a first member comprising at least one layer selected from the group consisting of copper and aluminum,
   (b) a second member having a cooking face and comprising cast iron,
   (c) the first member and the second member connected by means of a metallurgical bond.

2. The cooking utensil of claim 1, wherein the metallurgical bond is formed by a brazed joint.

3. The cooking utensil of claim 1, wherein the metallurgical bond is formed by casting the second member onto the first member.

4. The cooking utensil of claim 1, wherein at least one material of the first member is a wrought material.

5. The cooking utensil of claim 1, wherein the portion of the first member which is adjacent to the second member is a wrought material.

6. The cooking utensil of claim 1, wherein the first member further comprises at least one layer of stainless steel.

7. The cooking utensil of claim 1, wherein the first member further comprises at least one layer each of copper and aluminum.

8. The cooking utensil of claim 1, wherein all materials comprising the first member are wrought materials.

9. The cooking utensil of claim 1, wherein the metallurgical bond is formed by,
   (a) providing the first member comprising at least one layer selected from the group consisting of copper and aluminum,
   (b) providing the second member comprising cast iron,
   (c) positioning the second member and first member in a spaced relation,
   (d) introducing a filler metal between the first member and second member,
   (e) heating the filler metal, the second member, and the first member above the melting temperature of the filler metal, and,
   (f) urging the first and second members together, whereby the molten filler metal is caused to flow, forming the bond.

10. The cooking utensil of claim 1, wherein the metallurgical bond is formed by,
    (a) providing the first member comprising at least one layer selected from the group consisting of copper and aluminum,
    (b) providing the second member comprising cast iron,
    (c) positioning the second member and first member in a spaced relation,
    (d) introducing a filler metal between the first member and second member,
    (e) heating the filler metal, the second member, and the first member above the melting temperature of the filler metal, and,
    (f) urging the first and second members together, whereby the initial shapes of the first and second members are such that a line of progressively expanding contact is formed and peristaltic flow of the molten filler is produced, forming the bond.

11. The cooking utensil of claim 1, wherein the metallurgical bond is formed by,
    (a) providing the first member comprising at least one layer selected from the group consisting of copper and aluminum,
    (b) coating at least one face of the first member with a metal having a lower melting point than the cast iron, and,
    (c) introducing molten iron to the first member, whereby the coating of the first member is melted and the metallurgical bond is formed.

12. A method of brazing composite cookware comprising the steps of,
    (a) providing a first member comprising at least one layer selected from the group consisting of copper and aluminum,
    (b) providing a second member comprising cast iron,
    (c) positioning the second member and first member in a spaced relation,
    (d) introducing a filler metal between the first member and second member,
    (e) heating the filler metal, the second member, and the first member above the melting temperature of the filler metal, and,
    (f) urging the first and second members together, whereby the molten filler metal is caused to flow throughout the joint.

13. The method of claim 12, wherein the initial shapes of the first member and second members are such that urging them together produces a single line of progressively expanding contact, whereby peristaltic flow of the molten filler is produced.

14. The method of claim 12, further comprising the step of shearing the molten filler metal by a relative translation of the first member and the second member.

15. The method of claim 12, further comprising the step of roll bonding the layers which comprise the first member.

16. A method of producing composite cookware comprising the steps of,
    (a) providing a first member comprising at least one layer selected from the group consisting of copper and aluminum,
    (b) coating at least one face of the first member with a metal having a lower melting point than cast iron, and,
    (c) introducing molten iron to the first member, whereby the coating of the first member is melted and a metallurgical bond is formed.

17. The method of claim 16, wherein the first member comprises at least one layer of wrought copper.

* * * * *